US012608822B2

(12) United States Patent
Sawada

(10) Patent No.: US 12,608,822 B2
(45) Date of Patent: Apr. 21, 2026

(54) IMAGE PROCESSING DEVICE AND IMAGE PROCESSING METHOD

(71) Applicant: OMRON Corporation, Kyoto (JP)

(72) Inventor: Tatsuki Sawada, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 288 days.

(21) Appl. No.: 18/547,465

(22) PCT Filed: Dec. 20, 2021

(86) PCT No.: PCT/JP2021/047098
§ 371 (c)(1),
(2) Date: Aug. 22, 2023

(87) PCT Pub. No.: WO2022/190529
PCT Pub. Date: Sep. 15, 2022

(65) Prior Publication Data
US 2024/0153108 A1 May 9, 2024

(30) Foreign Application Priority Data

Mar. 12, 2021 (JP) ................................. 2021-040714

(51) Int. Cl.
*G06T 5/50* (2006.01)
*G06T 7/246* (2017.01)
(Continued)

(52) U.S. Cl.
CPC ................ *G06T 7/248* (2017.01); *G06T 7/74* (2017.01); *G06T 7/90* (2017.01);
(Continued)

(58) Field of Classification Search
CPC .. G06T 7/248; G06T 7/74; G06T 7/90; G06T 2207/10016; G06T 2207/10024; G06T 2207/30196; H04N 7/183
See application file for complete search history.

(56) References Cited

U.S. PATENT DOCUMENTS

2003/0035051 A1* 2/2003 Cho ...................... G01S 3/7865
348/169
2012/0243737 A1 9/2012 Ogawa
(Continued)

FOREIGN PATENT DOCUMENTS

CN 110287874 A 9/2019
CN 111402294 A 7/2020
(Continued)

OTHER PUBLICATIONS

International Search Report issued in Intl. Appln. No. PCT/JP2021/047098 mailed Mar. 15, 2022. English translation provided.
(Continued)

*Primary Examiner* — Mekonen T Bekele
(74) *Attorney, Agent, or Firm* — ROSSI, KIMMS & McDOWELL LLP

(57) ABSTRACT

An image processing apparatus includes a tracking target setter that sets a tracking target in a first frame of a video, a first feature tracker that tracks the tracking target in a second frame based on a first feature of the tracking target set in the first frame, a second feature tracker that tracks the tracking target in the second frame based on a second feature of the tracking target set in the first frame, a tracking manager that mixes a tracking result obtained by the first feature tracker with a tracking result obtained by the second feature tracker at a predetermined mixing ratio, and an output unit that (Continued)

outputs a detection position of the tracking target in the second frame based on a mixing result obtained by the tracking manager.

11 Claims, 9 Drawing Sheets

(51) Int. Cl.
    *G06T 7/73*           (2017.01)
    *G06T 7/90*           (2017.01)

(52) U.S. Cl.
    CPC ............... *G06T 2207/10016* (2013.01); *G06T 2207/10024* (2013.01); *G06T 2207/30196* (2013.01)

(56)         References Cited

U.S. PATENT DOCUMENTS

| | | |
|---|---|---|
| 2019/0006631 A1 | 1/2019 | Kim et al. |
| 2019/0066311 A1 | 2/2019 | Träff et al. |
| 2022/0172374 A1 | 6/2022 | Tsuji et al. |

FOREIGN PATENT DOCUMENTS

| | | | | |
|---|---|---|---|---|
| EP | 2503511 A1 * | 9/2012 | ............. | G06T 7/194 |
| JP | 2009151359 A * | 7/2009 | | |
| JP | 2011008687 A | 1/2011 | | |
| JP | 2012203613 A | 10/2012 | | |
| JP | 2020149111 A | 9/2020 | | |
| JP | 2020149641 A * | 9/2020 | | |
| JP | 2020149642 A | 9/2020 | | |
| JP | 2020160901 A | 10/2020 | | |

OTHER PUBLICATIONS

Written Opinion issued in Intl. Appln. No. PCT/JP2021/047098 mailed Mar. 15, 2022. English translation provided.
Office Action issued in Chinese Appln. No. 202180094085.2, mailed on Oct. 17, 2025.

* cited by examiner

First frame

Second frame

501

502

Tracking example A

First frame

602    Similar in color

601

Tracking example B

603    Differ in color

First frame

Second frame

Learning

701

703

Tracking result

702

Learning in first frame

Tracking target

Tracking in second frame

801

Generate image of color distance

803

802

Heat map for color features

First frame

901

Tracking example A

902

Similar in shape

Tracking example B

903

Differ in shape

First frame

Learning     1001

Second frame 1003     1002

Tracking result

Heat map for mixed features

IMAGE PROCESSING DEVICE AND IMAGE PROCESSING METHOD

FIELD

The present invention relates to an image processing apparatus and an image processing method.

BACKGROUND

In analyzing lines of flow using images captured with a camera, an imaging target is to be tracked precisely. Patent Literature 1 describes a technique for detecting a tracking target in a second frame based on reliability obtained based on two feature quantities of a tracking target in a first frame.

CITATION LIST

Patent Literature

Patent Literature 1: Japanese Unexamined Patent Application Publication No. 2012-203613

SUMMARY

Technical Problem

A target object such as a human in an image captured with a fisheye camera can appear differently depending on its relative position to the camera. Thus, the feature quantity may vary for the same imaging target depending on the relative position of the target to the camera.

One or more aspects of the present invention are directed to a technique for improving followability to a tracking target using an image captured with a fisheye camera.

Solution to Problem

The technique according to one or more aspects of the present invention provides the structure described below.

An image processing apparatus according to a first aspect of the present disclosure includes a tracking target setter that sets a tracking target in a first frame of a video, a first feature tracker that tracks the tracking target in a second frame based on a first feature of the tracking target set in the first frame, a second feature tracker that tracks the tracking target in the second frame based on a second feature of the tracking target set in the first frame, a tracking manager that mixes a tracking result obtained by the first feature tracker with a tracking result obtained by the second feature tracker at a predetermined mixing ratio, and an output unit that outputs a detection position of the tracking target in the second frame based on a mixing result obtained by the tracking manager.

The image processing apparatus tracks the tracking target using a mixture of the tracking results obtained using the first feature and the second feature of the tracking target at the predetermined mixing ratio based on the position of the tracking target in the imaging range. The image processing apparatus can improve followability to a tracking target by tracking the target based on multiple features.

The tracking result obtained by the first feature tracker may be a likelihood map indicating a likelihood of a position of the tracking target in the second frame obtained based on the first feature. The tracking result obtained by the second feature tracker may be a likelihood map indicating a likelihood of a position of the tracking target in the second frame obtained based on the second feature. The output unit may output a position with a highest likelihood in a likelihood map being the mixing result as the detection position of the tracking target in the second frame. The image processing apparatus can easily obtain the detection position of the tracking target with a heat map being the mixing result.

The predetermined mixing ratio may be set based on a position of the tracking target in an imaging range in the first frame. The first feature and the second feature of the tracking target may not be stably obtained depending on the position in the imaging range. The image processing apparatus can improve followability to a tracking target by increasing the mixing ratio of features that can be stably obtained.

The predetermined mixing ratio may be set based on an orientation of the tracking target relative to an imaging surface of the first frame. The image processing apparatus can improve followability to a tracking target by increasing the mixing ratio of features of the tracking target that can be stably obtained and associated with the first feature and the second feature.

The image processing apparatus may further include a detector that detects the tracking target in the first frame. The image processing apparatus can set a target object detected by the detector as the tracking target. When failing to track the tracking target, the image processing apparatus can detect a new target object and set the object as a tracking target.

The tracking target setter may obtain a distance from a center of an imaging range in the first frame to the tracking target. The tracking manager may set the predetermined mixing ratio based on the distance. The image processing apparatus can set an appropriate mixing ratio based on the distance from the center of the imaging range to the tracking target.

The first feature may be a color feature. The second feature may be a shape feature. The image processing apparatus can improve followability to a tracking target by mixing tracking results with color features stably obtained on the outer periphery of the imaging range and shape features stably obtained near the center of the imaging range.

The tracking manager may set the predetermined mixing ratio by increasing a mixing ratio of the color feature for a greater distance from a center of an imaging range in the first frame to the tracking target. The color features are obtained more stably when the distance from the center of the imaging range is greater. The image processing apparatus can thus improve followability to a tracking target by increasing the mixing ratio of the color features.

The first feature tracker may obtain a color distance between a color of the tracking target in the first frame and a color of the tracking target in the second frame, and generate a likelihood map indicating a likelihood of a position of the tracking target in the second frame based on the color distance. The second feature tracker may obtain a difference in shape between an image in the second frame and an image obtained by shifting the position of the tracking target in the first frame, and generate a likelihood map indicating a likelihood of the position of the tracking target in the second frame based on the difference. The image processing apparatus can easily mix tracking results by generating the likelihood map for the first feature and the second feature.

The second feature tracker may generate the likelihood map indicating the likelihood of the position of the tracking target in the second frame using a kernelized correlation filter (KCF). The image processing apparatus can accurately create a heat map for shape features using the KCF.

The output unit may output a detection frame in a size equal to a frame surrounding the tracking target in the first frame having a position of the tracking target in the second frame as a center. The image processing apparatus can easily output the detection frame without obtaining the size of the tracking target detected in the second frame.

An image processing method according to a second aspect of the present disclosure is implementable with a computer. The method includes setting a tracking target in a first frame of a video, tracking the tracking target in a second frame based on a first feature of the tracking target set in the first frame, tracking the tracking target in the second frame based on a second feature of the tracking target set in the first frame, mixing a tracking result obtained based on the first feature with a tracking result obtained based on the second feature at a predetermined mixing ratio, and outputting a detection position of the tracking target in the second frame based on a mixing result obtained by mixing the tracking results.

One or more aspects of the present invention may be directed to a program for causing a computer to implement the method or to a non-transitory storage medium storing the program. The above elements and processes may be combined with one another in any manner to form one or more aspects of the present invention.

Advantageous Effects

The technique according to the above aspects of the present invention improves followability to a tracking target using an image captured with a fisheye camera.

DETAILED DESCRIPTION

One or more embodiments according to one aspect of the present invention will now be described with reference to the drawings.

<Example Use>

Figure 1:
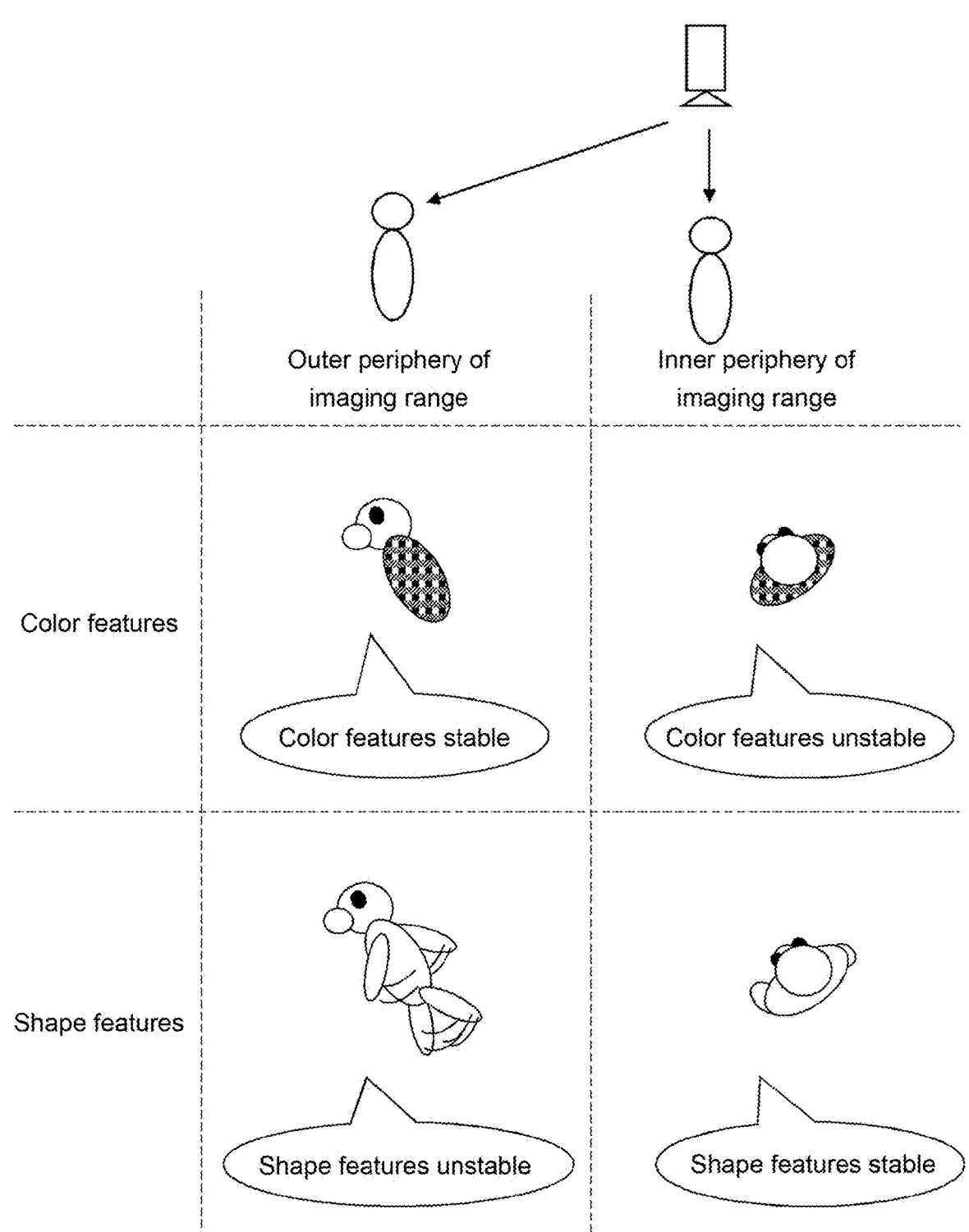
FIG. 1 is a schematic diagram describing an example use of an image processing apparatus according to an embodiment.

FIG. 1 is a schematic diagram describing an example use of an image processing apparatus according to an embodiment. The image processing apparatus can track a tracking target such as a human in a captured image based on, for example, color features or shape features.

A tracking target captured with a fisheye camera appears differently depending on the relative position of the target to the camera. A fisheye camera installed on the ceiling captures, for example, an image of the tracking target at the inner periphery of the imaging range including the center as viewed from the ceiling. The fisheye camera captures the image of the tracking target at the outer periphery of the imaging range as viewed from the side (lateral direction).

For a human as a tracking target located at the outer periphery of the imaging range, the colors of the clothing are visible in a larger area than a target at the inner periphery, and thus the color features are stable. For a human as a tracking target located at the inner periphery of the imaging range, the colors of the clothing are visible in a smaller area than a target at the outer periphery, and thus the color features are unstable.

For a human as a tracking target located at the outer periphery of the imaging range, the limbs are visible in a larger area than a target at the inner periphery, and thus the shape features are unstable. For a human as a tracking target located at the inner periphery of the imaging range, the limbs are visible in a smaller area than a target at the outer periphery, and thus the shape features are stable.

The image processing apparatus can improve tracking accuracy using stable features. More specifically, the followability to a tracking target is improved by tracking using a color feature algorithm at the outer periphery of the imaging range and tracking using a shape feature algorithm at the inner periphery of the imaging range.

The image processing apparatus changes a tracking algorithm based on the relative position of the tracking target to the camera. More specifically, the image processing apparatus tracks the tracking target using a combination (mixture) of tracking results based on multiple features at a predetermined ratio depending on the relative position of the tracking target to the camera.

The image processing apparatus can precisely track the tracking target using a combination of tracking algorithms based on multiple features at a ratio appropriate for the relative position of the tracking target to the camera. The image processing apparatus according to one or more embodiments of the present invention may be used for, for example, image sensors in analyzing the lines of flow.

Embodiments (Hardware Configuration)

Figure 2:
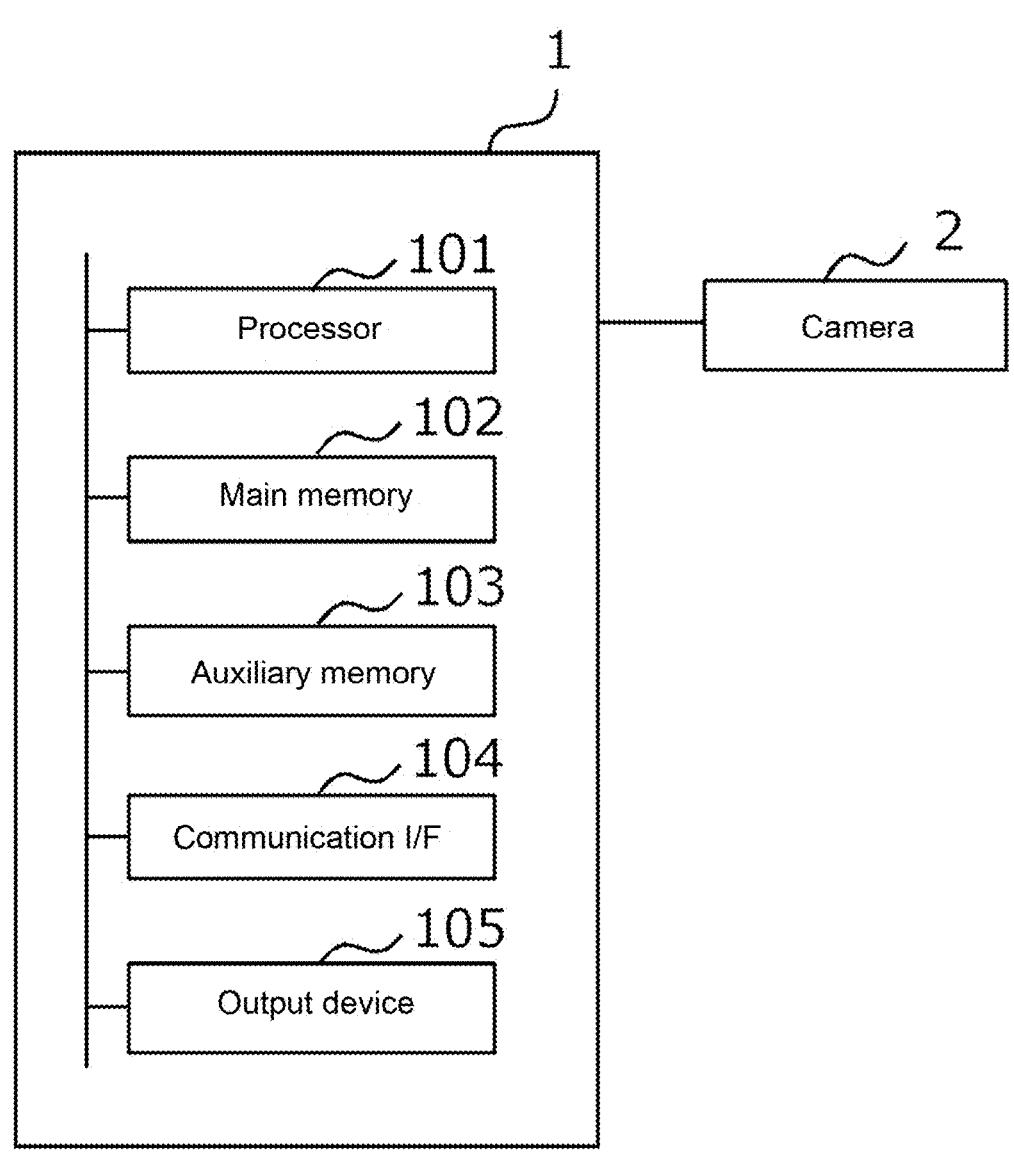
FIG. 2 is a schematic diagram of the image processing apparatus showing its example hardware configuration.

The hardware configuration of the image processing apparatus 1 will be described with reference to FIG. 2. FIG. 2 is a schematic diagram of the image processing apparatus 1 showing its example hardware configuration. The image processing apparatus 1 includes a processor 101, a main memory 102, an auxiliary memory 103, a communication interface (I/F) 104, and an output device 105. The processor 101 loads a program stored in the auxiliary memory 103 into the main memory 102 and executes the program to achieve the functions of the functional components described with reference to FIG. 3. The communication interface 104 allows wired or wireless communication. The output device 105 is a device for output, such as a display.

The image processing apparatus 1 may be a general-purpose computer, such as a personal computer, a server computer, a tablet terminal, or a smartphone, or a built-in computer, such as an onboard computer. The image processing apparatus 1 may be implemented by, for example, distributed computing with multiple computer devices. At least one of the functional units may be implemented using a cloud server. At least one of the functional units of the image processing apparatus 1 may be implemented by a dedicated hardware device, such as an application-specific integrated circuit (ASIC) or a field-programmable gate array (FPGA).

The image processing apparatus 1 is connected to the camera 2 with a wire, such as a universal serial bus (USB) cable or a local area network (LAN) cable, or wirelessly, for example, through Wi-Fi, and receives image data captured with the camera 2. The camera 2 is an imaging device including an optical system including a lens and an image sensor, for example, a charge-coupled device (CCD) or a complementary metal-oxide semiconductor (CMOS).

The image processing apparatus 1 may be integral with the camera 2. At least a part of the processing performed by the image processing apparatus 1, for example, target detection or target tracking for a captured image, may be performed with the camera 2. Further, the results of target tracking performed by the image processing apparatus 1 may be transmitted to an external device and presented to the user.

(Functional Configuration)

Figure 3:
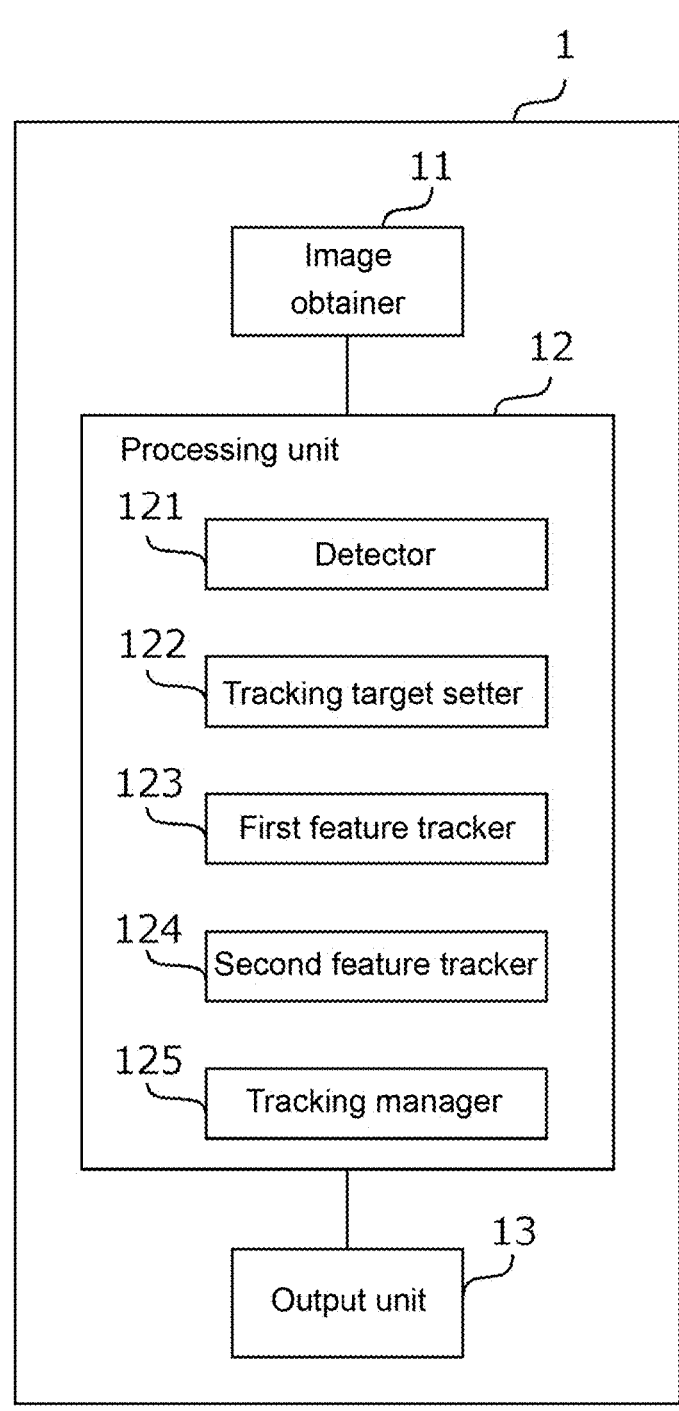
FIG. 3 is a functional block diagram of the image processing apparatus.

FIG. 3 is a functional block diagram of the image processing apparatus 1. The image processing apparatus 1 includes an image obtainer 11, a processing unit 12, and an output unit 13. The processing unit 12 includes a detector 121, a tracking target setter 122, a first feature tracker 123, a second feature tracker 124, and a tracking manager 125.

The image obtainer 11 transmits video data obtained from the camera 2 to the processing unit 12. The detector 121 in the processing unit 12 detects a tracking target such as a human in a frame image received from the image obtainer 11. The detector 121 may detect the target object using, for example, background subtraction or interframe subtraction.

The tracking target setter 122 sets the target object detected by the detector 121 as the tracking target. The tracking target setter 122 learns the features of the tracking target and tracks the target in subsequent frames based on the learned features. The tracking target setter 122 learns, for example, features such as color features and shape features of the tracking target.

The tracking target setter 122 obtains the distance between the tracking target and the center of the frame image. The distance between the tracking target and the center of the frame image can be calculated as the distance between the center coordinates of the tracking target and the center coordinates of the frame image. The obtained distance is used to set a predetermined mixing ratio used in mixing color features and shape features.

The first feature tracker 123 tracks the target in the subsequent frame (also referred to as a second frame) after the tracking target is set in the prior frame (also referred to as a first frame) based on a first feature such as the color features learned by the tracking target setter 122. The first feature tracker 123 generates a heat map (likelihood map) for color features as a tracking result in the second frame by obtaining a color distance from the tracking target in the first frame. The color distance is an index indicating similarity between two colors, for example, a distance within a color space such as the red-green-blue (RGB) color model.

The second feature tracker 124 tracks the target in the second frame after the tracking target is set in the first frame based on the second feature such as the shape features learned by the tracking target setter 122. The second feature tracker 124 generates a heat map (likelihood map) for shape features as a tracking result by shifting and overlapping the tracking target set in the first frame with the tracking target in the second frame and obtaining a difference in shape.

The tracking manager 125 sets a predetermined mixing ratio used in mixing the tracking result for the first feature with the tracking result for the second feature based on the distance between the tracking target and the center of the frame image obtained by the tracking target setter 122. The predetermined mixing ratio is set based on, for example, the distance from the center of the frame image to the tracking target.

For example, the mixing ratio of color features (first feature) is higher and the mixing ratio of shape features (second feature) is lower as the distance from the center of the frame image to the tracking target is longer. The mixing ratio of color features is lower and the mixing ratio of shape features is higher as the distance from the center of the frame image to the tracking target is shorter.

The tracking manager 125 mixes the tracking result for the first feature with the tracking result for the second feature with the set mixing ratio. The tracking results for the first feature and the second feature show the difference from the tracking target for each feature. The tracking manager 125 mixes the tracking results for the first feature and the second feature with a mixing ratio set based on the position of the tracking target. The tracking manager 125 can obtain a tracking result that appropriately reflects the tracking result based on respective features depending on the position of the tracking target.

The output unit 13 outputs the coordinates of the position with the smallest difference in the tracking results mixed by the tracking manager 125 as the detection result of the tracking target in the second frame. The output unit 13 may output the center coordinates of the area including multiple coordinates with the smallest difference as the detection result of the tracking target.

(Tracking Process)

Figure 4:
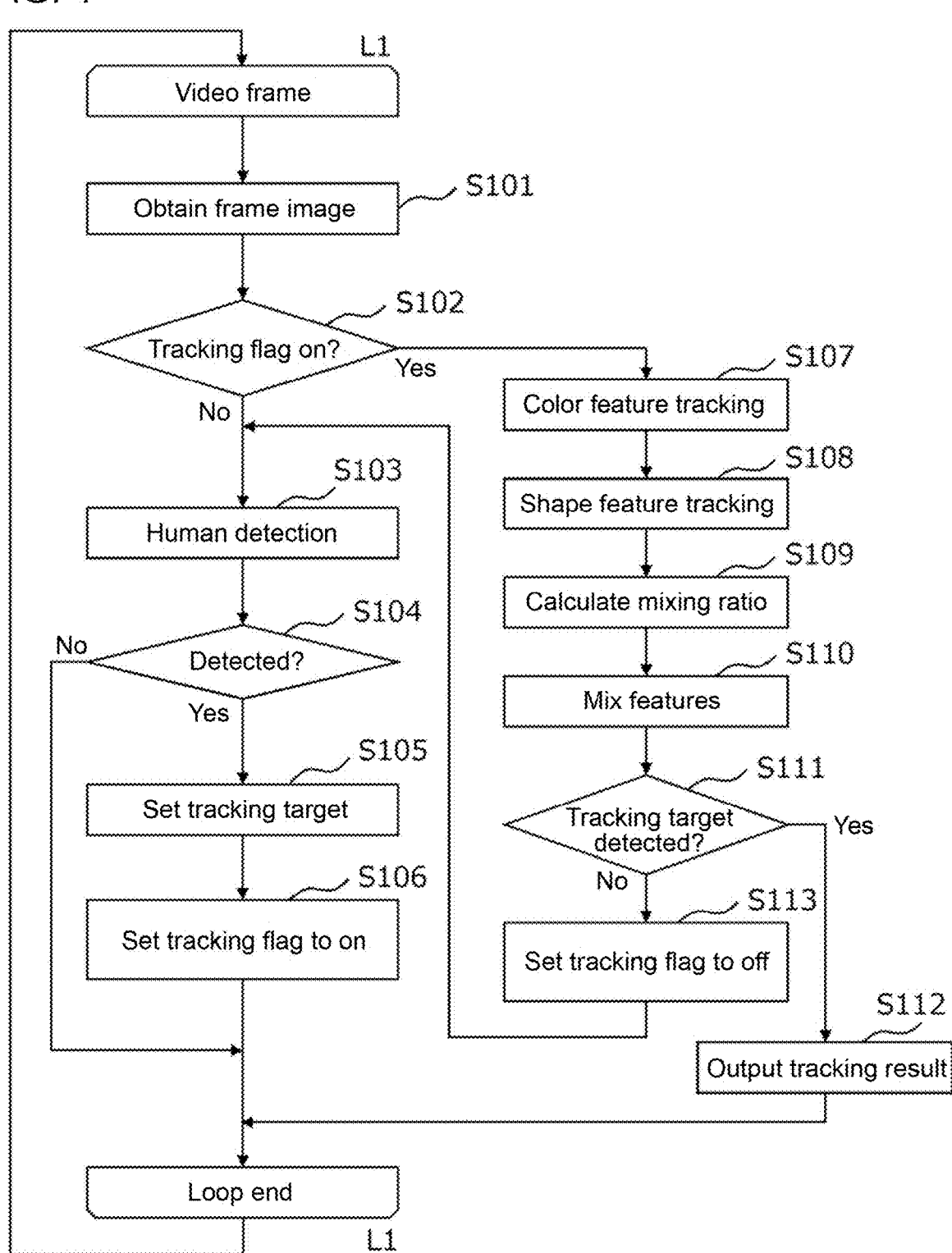
FIG. 4 is a flowchart of an example of a tracking process.

An overall tracking process in the present embodiment will be described with reference to FIG. 4. FIG. 4 is a flowchart of an example of a tracking process. The tracking process starts when, for example, a user instructs the image processing apparatus 1 to track. A loop process L1 shown in FIG. 4 is performed for each frame of a video.

In S101, the processing unit 12 obtains frame images from the image obtainer 11. In S102, the processing unit 12 determines whether a tracking flag is on. The tracking flag is set to on when the tracking target has been set. The tracking flag is set to off when the tracking target has not been set. The set values of the tracking flag can be recorded into the main memory 102 or the auxiliary memory 103. When the tracking flag is on (Yes in S102), the processing advances to S107. When the tracking flag is off (No in S102), the processing advances to S103.

In S103, the detector 121 detects a human in the frame image. The detector 121 may detect a human using, for example, background subtraction that extracts an area with a change between a frame image and a prestored background image, or interframe subtraction that extracts an area with a change between frames.

The tracking target is a human in the process shown in FIG. 4, but any movable object can be a tracking target. The movable object being a tracking target may have features to be extracted with stability that differs depending on the relative position to the camera, such as color features and shape features.

In S104, the detector 121 determines whether a human is detected in S103. When a human is detected (Yes in S104), the processing advances to S105. When no human is detected (No in S104), the processing returns to S101, and the tracking process starts for subsequent video frames.

In S105, the tracking target setter 122 sets the human detected in S104 as the tracking target. When multiple humans are detected in S104, the tracking target setter 122 may set multiple humans as tracking targets and set each human to be tracked. The tracking target setter 122 obtains (learns) the color features and shape features of the tracking target.

Figure 5:
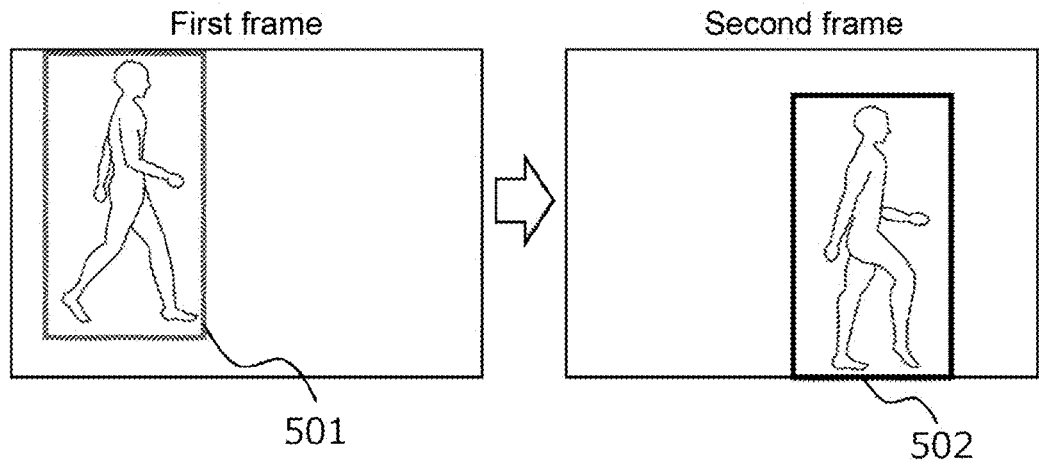
FIG. 5 is a diagram describing setting of a tracking target.

Setting of a tracking target will now be described with reference to FIG. 5. The first frame is a starting frame for detecting a human and setting a tracking target 501. The second frame is the frame after the starting frame. Tracking is the process of obtaining information about where the tracking target 501 is located in the second frame based on the features of the tracking target 501 set in the first frame.

In S106 shown in FIG. 4, the tracking target setter 122 turns on the tracking flag. The value of the tracking flag is recorded into, for example, the main memory 102, and is stored without being initialized as the processing advances to the subsequent frame. The processing returns to S101, and the tracking process starts for subsequent video frames. In S102, the tracking flag is set to on, and the processing advances to S107.

Figure 6:
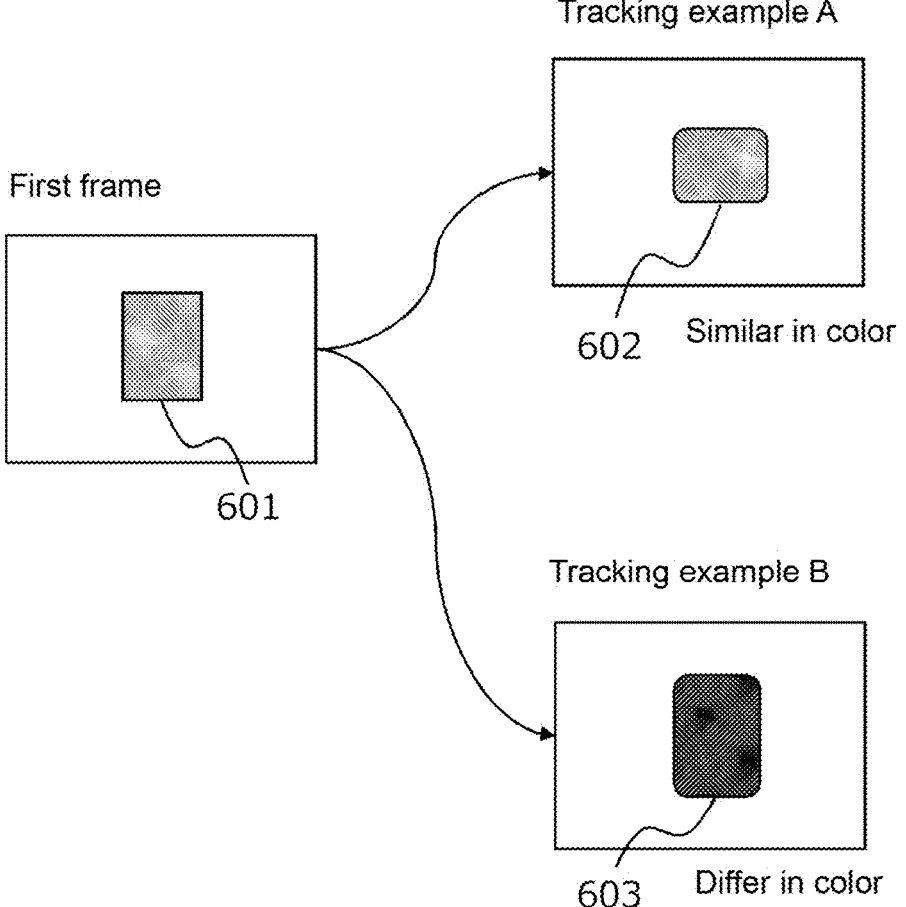
FIG. 6 is a diagram describing tracking using color features.

In S107, the first feature tracker 123 obtains the tracking result with color features of the frame image. Tracking of a tracking target with color features will now be described with reference to FIGS. 6 to 8. FIG. 6 is a diagram describing tracking using color features. The first frame includes a tracking target 601 set in S105. In a tracking example A, a target object 602 is similar in color to the tracking target 601. In a tracking example B, a target object 603 differs in color from the tracking target 601.

Tracking using color features determines a target object more similar in color to the tracking target as the tracking result. In an example of FIG. 6, the target object 602 and the target object 603 are in the frame image. The target object 602 more similar in color to the tracking target is determined as the tracking result.

Figure 7:
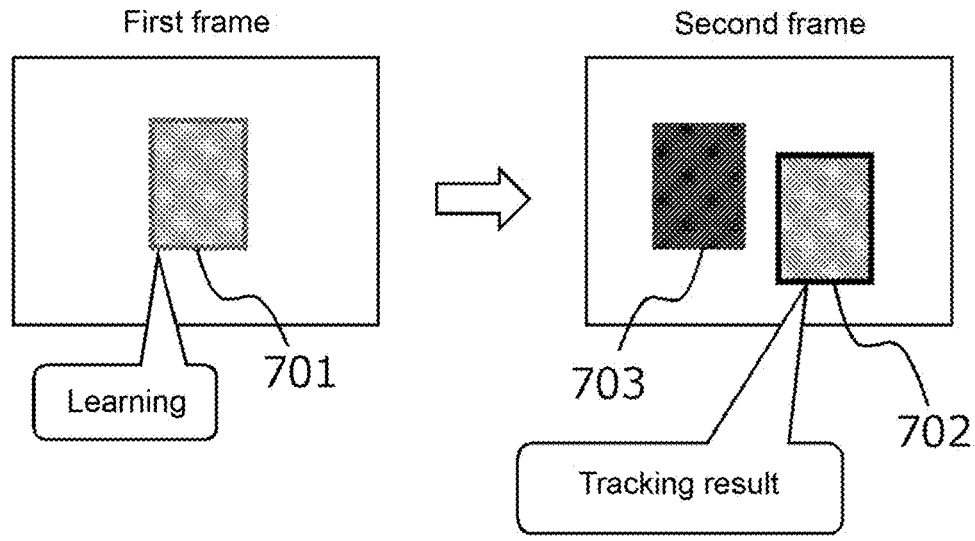
FIG. 7 is a diagram describing a specific example of the tracking using color features.

FIG. 7 is a diagram describing a specific example of the tracking using color features. The tracking target setter 122 sets a tracking target 701 in the first frame. The first feature tracker 123 learns an area including the tracking target 701 as a learning area and tracks an area similar in color to the tracking target 701 in the second frame. A target object 702 is more similar in color to the tracking target 701 than a target object 703 and thus is determined as the tracking result.

Figure 8:
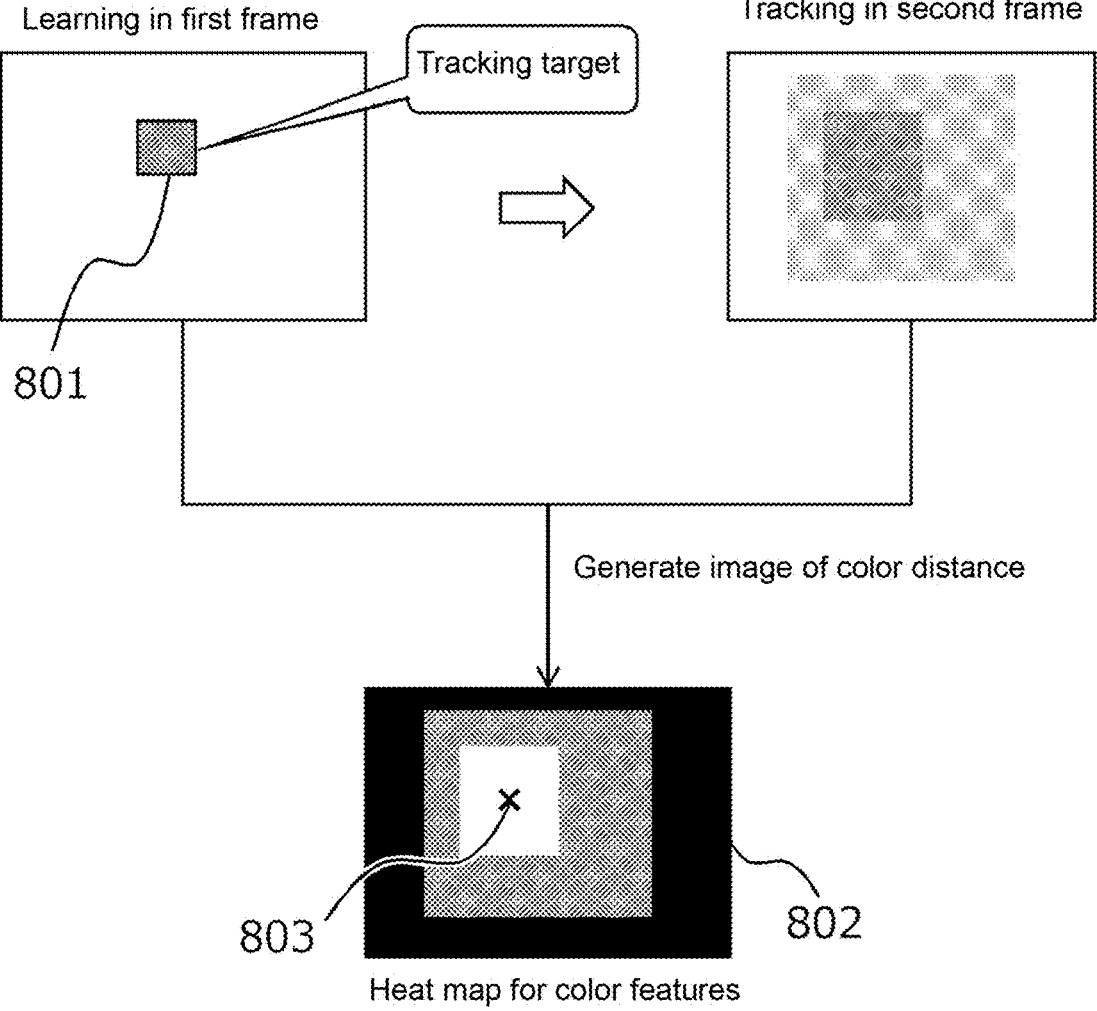
FIG. 8 is a diagram describing generation of a heat map for color features.

FIG. 8 is a diagram describing generation of a heat map for color features. The tracking target setter 122 sets a tracking target 801 in the first frame. The first feature tracker 123 learns the tracking target 801. The first feature tracker 123 tracks the second frame to obtain a color distance between the color of the tracking target 801 that has been learned and the color of the second frame. The color distance can be obtained by, for example, comparing the average color of the pixels included in the tracking target 801 with the color of each pixel in the second frame.

The first feature tracker 123 generates a heat map for color features based on the color distance obtained for each pixel in the second frame. FIG. 8 shows a schematic diagram of an image of a heat map 802 generated by the first feature tracker 123. In the heat map 802 for color features, the likelihood is set higher as the color distance is smaller. In tracking using color features, the tracking position of the tracking target 801 in the second frame can be determined to be center coordinates 803 of an area with the highest likelihood in the heat map 802. The center coordinates 803 are also referred to as a peak position 803 of the heat map 802.

In human detection, the clothing colors have larger individual differences than the shape features. The color features can be tracked using simpler algorithms than the shape features. FIG. 8 shows an example of generating the heat map 802 based on the color distance, but the heat map is not limited to this. The first feature tracker 123 may generate the heat map 802 based on, for example, the similarity to a color histogram of the tracking target 801.

Figure 9:
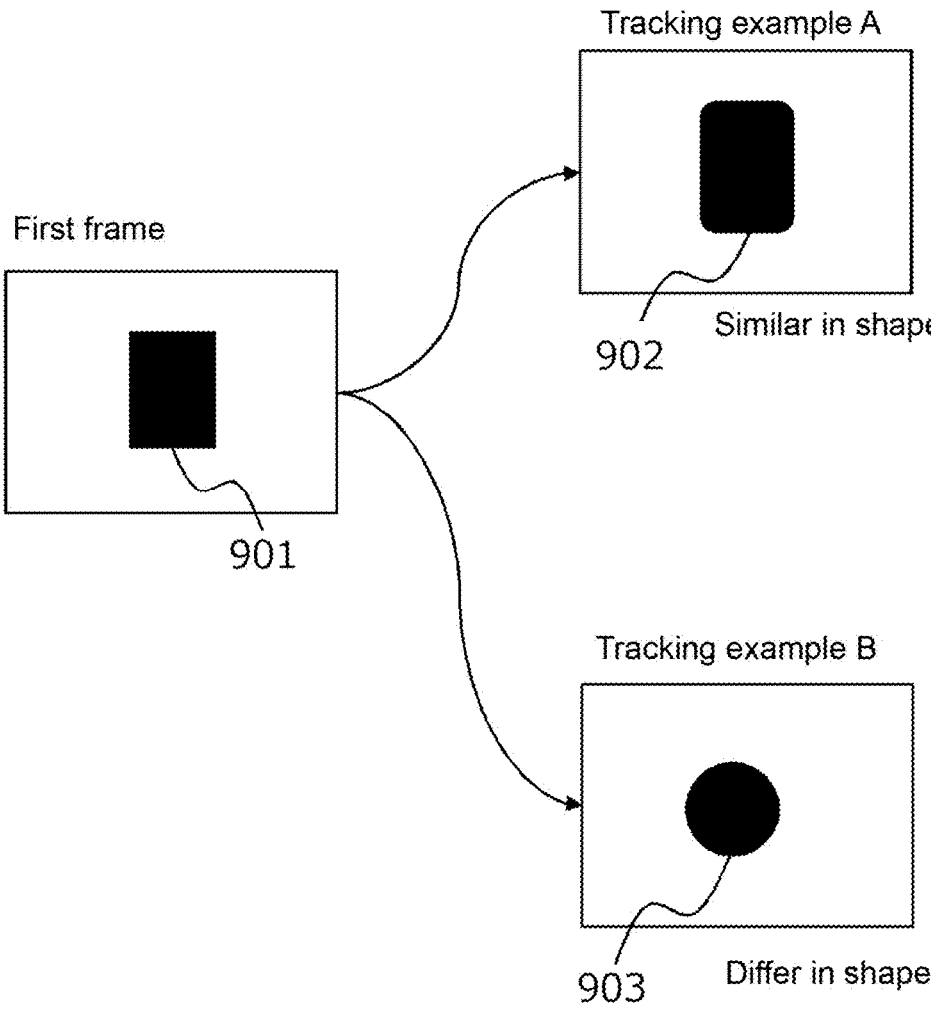
FIG. 9 is a diagram describing tracking using shape features.

In S108 shown in FIG. 4, the second feature tracker 124 obtains the tracking results with the shape features of the frame image. Tracking of a tracking target using the shape features will now be described with reference to FIGS. 9 to 11. FIG. 9 is a diagram describing tracking using shape features. The first frame includes a tracking target 901 set in S105. In the tracking example A, a target object 902 is similar in shape to the tracking target 901. In the tracking example B, a target object 903 differs in shape from the tracking target 901.

Tracking using shape features determines a target object more similar in shape to the tracking target as the tracking result. In an example of FIG. 9, the target object 902 and the target object 903 are in the frame image. The tracking result is determined to be the target object 902 more similar in shape to the tracking target.

Figure 10:
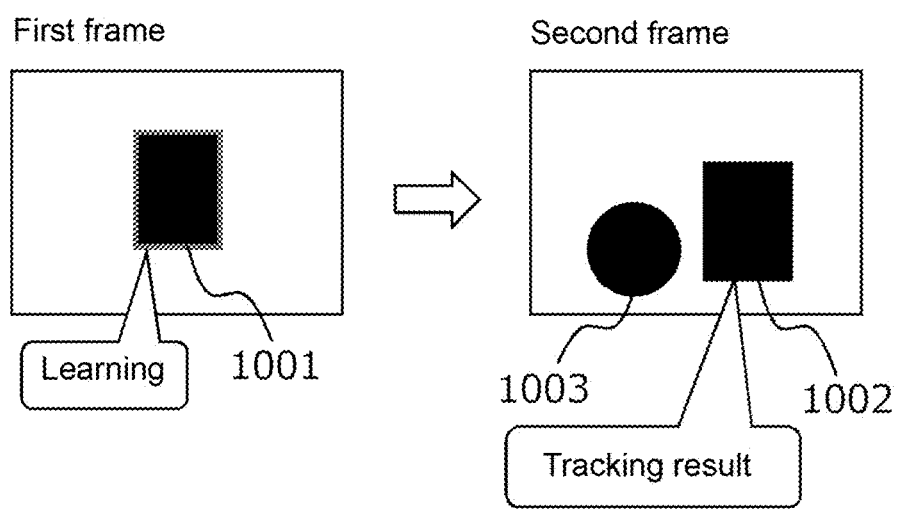
FIG. 10 is a diagram describing a specific example of the tracking using shape features.

FIG. 10 is a diagram describing a specific example of the tracking using shape features. The tracking target setter 122 sets a tracking target 1001 in the first frame. The second feature tracker 124 learns an area including the tracking target 1001 as a learning area and tracks an area similar in shape to the tracking target in the second frame. A target object 1002 is more similar in shape to the tracking target 1001 than a target object 1003 and thus is determined as the tracking result.

Figure 11:
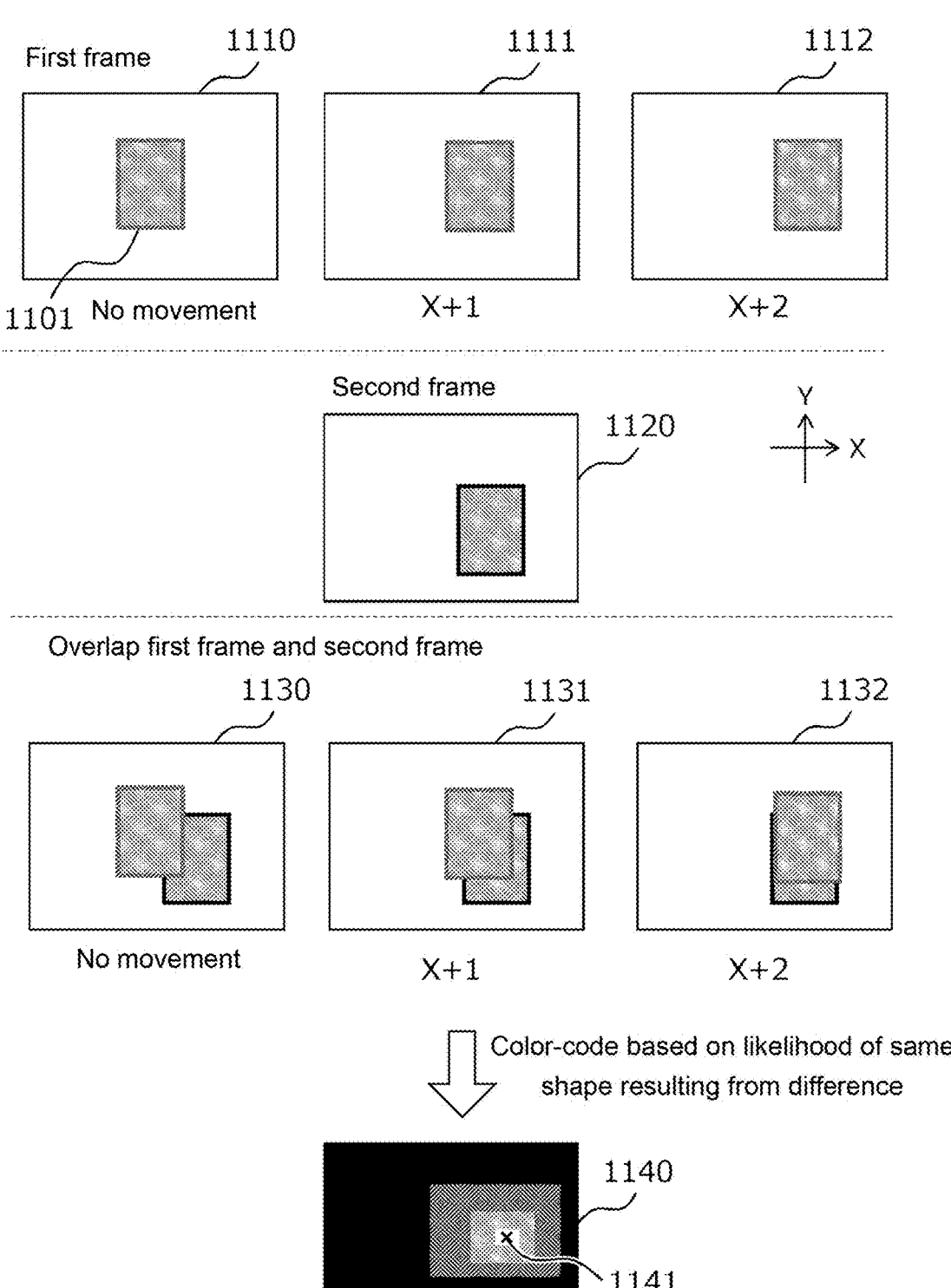
FIG. 11 is a diagram describing generation of a heat map for shape features.

FIG. 11 is a diagram describing generation of a heat map for shape features. The tracking target setter 122 sets a tracking target 1101 in a first frame 1110. The tracking target 1101 is moved by one pixel in a frame 1111 and two pixels in a frame 1112 in the positive X-direction from the tracking target in the first frame 1110.

The second feature tracker 124 overlaps the first frame 1110, the frame 1111, and the frame 1112 with a second frame 1120. The second frame 1120 overlaps with the first frame 1110 to generate a frame 1130, with the frame 1111 to generate a frame 1131, and with the frame 1112 to generate a frame 1132.

For the frame 1130, the second feature tracker 124 assigns the likelihood of being the same shape to the position (e.g., center coordinates) of the tracking target 1101 without movement based on the difference between the tracking target 1101 without movement and the second frame 1120. The second feature tracker 124 can, for example, obtain the likelihood of being the same shape by inputting the area of the second frame at the same position as the tracking target 1101 into a discriminator that has learned about the tracking target 1101 by machine learning.

In the frame 1131 as well, the second feature tracker 124 assigns a likelihood of being the same shape to the position of the tracking target 1101 moved by one pixel based on the difference between the tracking target 1101 moved by one pixel in the positive X-direction and the second frame 1120. In the frame 1132, the second feature tracker 124 assigns the likelihood of being the same shape to the position of the tracking target 1101 moved by two pixels based on the difference between the tracking target 1101 moved by two pixels in the positive X-direction and the second frame 1120.

The second feature tracker 124 can generate a heat map for shape features by moving the tracking target 1101 within the second frame and obtaining the difference. FIG. 11 shows a schematic diagram of an image of a heat map 1140 generated by the second feature tracker 124. In the heat map 1140 for shape features, the likelihood is set higher as the difference is smaller (as the likelihood of being the same shape is higher).

FIG. 11 shows an example of obtaining a difference by moving the tracking target 1101 by one pixel and two pixels in the positive X-direction. The second feature tracker 124 can obtain a difference by moving the tracking target 1101 to each pixel within the second frame. The second feature tracker 124 generates the heat map 1140 by obtaining a difference for each pixel across the second frame.

When the movement range of the tracking target 1101 is limited, the second feature tracker 124 may, for example, move the tracking target 1101 by −10 to +10 in the X-direction and −10 to +10 in the Y-direction to obtain the difference. The second feature tracker 124 can generate the heat map 1140 by setting the maximum value of the difference in the areas (pixels) in which the tracking target 1101 is not moved.

In tracking using shape features, the tracking position of the tracking target in the second frame can be determined to be center coordinates 1141 of the area with the highest likelihood in the heat map 1140. The center coordinates 1141 are also referred to as a peak position 1141 of the heat map 1140.

The example of FIG. 11 uses a simplified algorithm to explain tracking using shape features. The second feature tracker 124 can track a tracking target with shape features using a filter called a kernelized correlation filter (KCF). The KCF reduces the amount of calculation by performing the Fourier transform of the image for calculation in a spectral space. The KCF uses a regression equation rather than a subtraction to perform a calculation. The KCF is thus a method that can improve robustness.

The shape feature tracking may use a method to extract features using convolution operations and compares them in a feature quantity space, rather than in the spectral space. This method may increase the amount of calculation more than the KCF but can achieve higher followability than the KCF.

In S109 shown in FIG. 4, the tracking manager 125 calculates the mixing ratio of the tracking result for color features obtained in S107 and the tracking result for shape features obtained in S108. Calculation of the mixing ratio will now be described with reference to FIG. 12.

The mixing ratio is calculated based on the distance from center coordinates 1201 of the frame image to a human set as the tracking target. For example, the mixing ratio for mixing shape features can be calculated using Formula 1 below. The mixing ratio of shape features is a value in the range of 0.0 to 1.0.

$$\text{Mixing ratio of shape features} = 1.0 - (\text{distance to tracking target}/d1) \times \alpha \quad (1)$$

Figure 12:
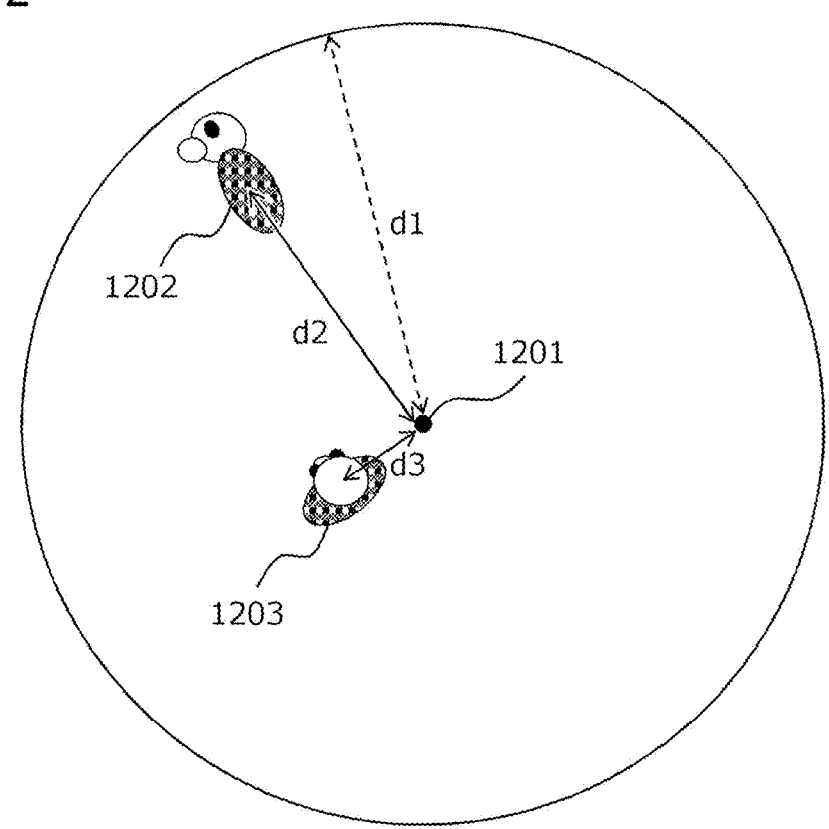
FIG. 12 is a diagram describing calculation of a mixing ratio.

In Formula 1, d1 is the maximum distance from the center coordinates 1201 of the frame image to the frame boundary. In FIG. 12, the distance to the tracking target is d2 for a tracking target 1202 located near the outer periphery of the frame image, and d3 for a tracking target 1203 located near the center of the frame image.

In the formula, α is the weighting coefficient based on the features of the tracking target and can be, for example, 0.7. The coefficient α may be set to be less than 0.7 when limb movements affect the accuracy of shape feature tracking in, for example, an operation at a factory. The coefficient α for the mixing ratio of color features can be set to greater than 0.7 when, for example, the uniform color is red or other distinctive colors. The coefficient α may be changed based on the specific features of the tracking target.

The mixing ratio of color features can be calculated using Formula 2 below. The mixing ratio of shape features is calculated using the value obtained in Formula 1.

$$\text{Mixing ratio of color features} = 1.0 - \text{mixing ratio of shape features} \quad (2)$$

The method for calculating the mixing ratio of shape features and color features is not limited to Formulas 1 and 2. In Formula 1, the mixing ratio of shape features decreases as the distance from the center coordinates 1201 of the frame image to the tracking target increases. Formula 1 may not be a linear equation but may be a quadratic or a higher equation, or a nonlinear equation. The mixing ratio of color features may be calculated first, and the mixing ratio of shape features may be calculated as the difference between 1.0 and the mixing ratio of color features, as in Formula 2. In this case, the equation for obtaining the mixing ratio of color features is a relational equation in which the mixing ratio of color features increases as the distance to the tracking target increases.

In S110, the tracking manager 125 mixes the tracking result for the first feature with the tracking result for the second feature based on the mixing ratio calculated in S109. Mixing features will now be described with reference to FIG. 13.

Figure 13:
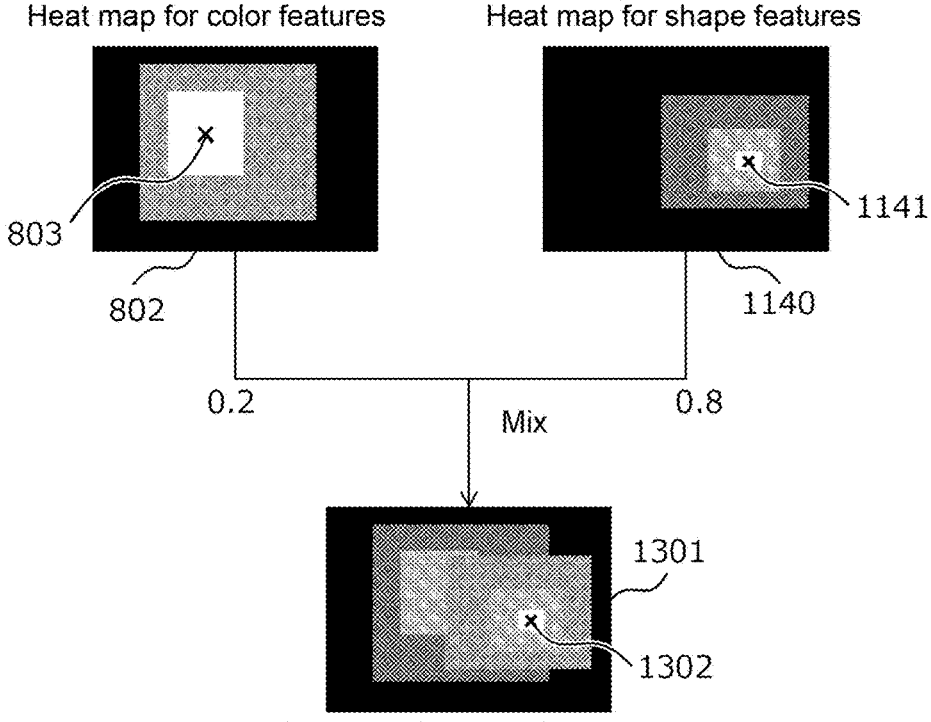
FIG. 13 is a diagram describing mixing features.

FIG. 13 shows an example of mixing the heat map 802 for color features with the heat map 1140 for shape features to produce a heat map 1301 for mixed features as the mixing result. The tracking manager 125 mixes each corresponding pixel of the heat map 802 for color features and the heat map 1140 for shape features by Formula 3 below to generate the heat map 1301 for mixed features.

$$\text{Mixed features} = \text{color features} \times \text{mixing ratio of color features} + \text{shape features} \times \text{mixing ratio of shape features} \quad (3)$$

FIG. 13 shows an example with a mixing ratio of 0.2 for color features and 0.8 for shape features. In the heat map 1301 for mixed features, the peak position 1141 of the heat map 1140 for shape features has a greater value than the peak position 803 of the heat map 802 for color features. The peak position 1140 is thus determined to be a tracking result 1302. The peak position 1302 in the heat map 1301 for mixed features is determined as the tracking result 1302.

FIG. 13 shows an example of mixing the heat map for the first feature with the heat map for the second feature, but the mixing is not limited to this. The tracking manager 125 may mix the tracking results of the first feature and the second feature with another method using, for example, the detection position of the tracking target as the position between the peak positions of the respective heat maps proportionally divided by the mixing ratio.

In S111 shown in FIG. 4, the tracking manager 125 determines whether a tracking target is detected in the heat map 1301 for mixed features being the mixing result. In an example of FIG. 13, the tracking manager 125 can determine that the peak position 1302 is detected as the position of the tracking target. The tracking manager 125 can determine that a tracking target is not detected when the peak position is not detected in the heat map 1301 for mixed features, or for example, when no position is greater than or equal to a predetermined threshold in the heat map 1301.

When a tracking target is detected in the mixing result (Yes in S111), the processing advances to S112. When a tracking target is not detected in the mixing result (No in S111), the processing advances to S113.

In S112, the output unit 13 outputs the tracking result. The output unit 13 superimposes a detection frame on the position of the tracking target detected in S111. The size of the detection frame can be, for example, the size of the tracking target set in S105. When the tracking result is output, the processing returns to S101 and the tracking process starts for subsequent video frames.

In S112, the tracking manager 125 turns off the tracking flag. The processing returns to S103 and a new tracking target is set in S103 to S106. The process in FIG. 4 shows an example of setting a new tracking target when tracking a target fails, but the timing for setting a new tracking target may be other timing. For example, the tracking target setter 122 may detect a human and reset the tracking target every predetermined number of frames or every predetermined time period.

Effects

In the above embodiment, the image processing apparatus 1 sets the mixing ratio of tracking results with color features and tracking results with shape features based on the relative position of the tracking target to the camera. More specifically, color features such as the clothing color are more stable at the outer periphery of the image away from the center. The mixing ratio of color features is thus set higher than shape features at the outer periphery of the image. In contrast, around the center of the image, limbs are less viewable and shape features are more stable. The mixing ratio of shape features is thus set higher than color features around the center of the image.

The image processing apparatus 1 can track a target precisely by changing the mixing ratio of multiple features of the tracking target based on the respective positions in the imaging range. More specifically, when analyzing lines of flow in an image captured with a fisheye camera, the followability to a tracking target is improved at the outer periphery of the imaging range away from the center with the mixing ratio of color features set higher.

<Others>

The above embodiments describe exemplary structures according to one or more aspects of the present invention. The present invention is not limited to the specific embodiments described above, but may be modified variously within the scope of the technical ideas of the invention.

In the above embodiment, for example, the camera 2 is a fisheye camera, but the camera is not limited to the fisheye camera. The camera 2 can be any imaging device that can capture an image of the tracking target from above or from the side, based on the position of the tracking target. The camera 2 is not limited to being installed on the ceiling, but can be installed on any place to capture an image looking down at the tracking target.

In the above embodiment, the image processing apparatus 1 sets the mixing ratio based on the distance from the center of the imaging range to the tracking target, but the setting is not limited to this. The image processing apparatus 1 may estimate the position of a tracking target and set the mixing ratio based on, for example, the distance to the tracking target measured by the camera 2 or the distance between the head top and the tip of the toes of the human.

The image processing apparatus 1 may set the mixing ratio, independently of the position of the tracking target, based on the orientation of the tracking target relative to the imaging surface of the captured image, when the appearance of the tracking target varies due to, for example, changes in posture when the human is lying down. The orientation of the tracking target relative to the imaging surface can be estimated based on, for example, the shape and the size of the tracking target.

The image processing apparatus 1 may also set the mixing ratio based on the difference from a prepared background image. When the color features of the tracking target are noticeable relative to the background image, the mixing ratio may be set by prioritizing the color features. When, for example, tracking a human in a black suit on a black floor, color features do not appear noticeably. When tracking red or blue clothing on a black floor, color features appear noticeably. A comparison is then performed with the prepared background area. When the color features (red clothing or blue clothing) are noticeable against the background, the mixing ratio is set to prioritize the color features.

APPENDIX 1

(1) An image processing apparatus (1), comprising:

a tracking target setter (122) configured to set a tracking target in a first frame of a video;

a first feature tracker (123) configured to track the tracking target in a second frame based on a first feature of the tracking target set in the first frame;

a second feature tracker (124) configured to track the tracking target in the second frame based on a second feature of the tracking target set in the first frame;

a tracking manager (125) configured to mix a tracking result obtained by the first feature tracker with a tracking result obtained by the second feature tracker at a predetermined mixing ratio; and an output unit (13) configured to output a detection position of the tracking target in the second frame based on a mixing result obtained by the tracking manager.

(2) An image processing method implementable with a computer, the method comprising:

(S105) setting a tracking target in a first frame of a video;

(S107) tracking the tracking target in a second frame based on a first feature of the tracking target set in the first frame;

(S108) tracking the tracking target in the second frame based on a second feature of the tracking target set in the first frame;

(S109, S110) mixing a tracking result obtained based on the first feature with a tracking result obtained based on the second feature at a predetermined mixing ratio; and (S112) outputting a detection position of the tracking target in the second frame based on a mixing result obtained by mixing the tracking results.

REFERENCE SIGNS LIST

1: image processing apparatus, 2: camera, 11: image obtainer, 12: processing unit, 121: detector, 122: tracking target setter, 123: first feature tracker, 124: second feature tracker, 125: tracking manager, 13: output unit

The invention claimed is:

1. An image processing apparatus, comprising:

a memory configured to store instructions; and a processor configured to execute the instructions stored in the memory to thereby implement:

a tracking target setter configured to set a tracking target in a first frame of a video;

a first feature tracker configured to track the tracking target in a second frame based on a first feature of the tracking target set in the first frame;

a second feature tracker configured to track the tracking target in the second frame based on a second feature of the tracking target set in the first frame;

a tracking manager configured to mix a tracking result obtained by the first feature tracker with a tracking result obtained by the second feature tracker at a predetermined mixing ratio; and an output unit configured to output a detection position of the tracking target in the second frame based on a mixing result obtained by the tracking manager, wherein the first feature is a color feature, and the second feature is a shape feature, the first feature tracker obtains a color distance between a color of the tracking target in the first frame and a color of the tracking target in the second frame, and generates a likelihood map indicating a likelihood of a position of the tracking target in the second frame based on the color distance, and the second feature tracker obtains a difference in shape between an image in the second frame and an image obtained by shifting the position of the tracking target in the first frame, and generates a likelihood map indicating a likelihood of the position of the tracking target in the second frame based on the difference.

2. The image processing apparatus according to claim 1, wherein the output unit outputs a position with a highest likelihood in a likelihood map being the mixing result as the detection position of the tracking target in the second frame.

3. The image processing apparatus according to claim 1, wherein the predetermined mixing ratio is set based on a position of the tracking target in an imaging range in the first frame.

4. The image processing apparatus according to claim 1, wherein the predetermined mixing ratio is set based on an orientation of the tracking target relative to an imaging surface of the first frame.

5. The image processing apparatus according to claim 1, wherein the processor is configured to further execute the instructions stored in the memory to thereby implement:

a detector configured to detect the tracking target in the first frame.

6. The image processing apparatus according to claim 1, wherein the tracking target setter obtains a distance from a center of an imaging range in the first frame to the tracking target, and the tracking manager sets the predetermined mixing ratio based on the distance.

7. The image processing apparatus according to claim 1, wherein the tracking manager sets the predetermined mixing ratio by increasing a mixing ratio of the color feature for a greater distance from a center of an imaging range in the first frame to the tracking target.

8. The image processing apparatus according to claim 1, wherein the second feature tracker generates the likelihood map indicating the likelihood of the position of the tracking target in the second frame using a kernelized correlation filter.

9. The image processing apparatus according to claim 1, wherein the output unit outputs a detection frame in a size equal to a frame surrounding the tracking target in the first frame having a position of the tracking target in the second frame as a center.

10. An image processing method implementable with a computer, the method comprising:

setting a tracking target in a first frame of a video;

tracking the tracking target in a second frame based on a first feature of the tracking target set in the first frame;

tracking the tracking target in the second frame based on a second feature of the tracking target set in the first frame;

mixing a tracking result obtained based on the first feature with a tracking result obtained based on the second feature at a predetermined mixing ratio; and outputting a detection position of the tracking target in the second frame based on a mixing result obtained by mixing the tracking result obtained based on the first feature with the tracking result obtained based on the second feature at the predetermined mixing ratio, wherein the first feature is a color feature, and the second feature is a shape feature, in the tracking the tracking target in the second frame based on the first feature, a color distance between a color of the tracking target in the first frame and a color of the tracking target in the second frame is obtained, and a likelihood map indicating a likelihood of a position of the tracking target in the second frame is generated based on the obtained color distance, and in the tracking the tracking target in the second frame based on the second feature, a difference in shape between an image in the second frame and an image obtained by shifting the position of the tracking target in the first frame is obtained, and a likelihood map indicating a likelihood of the position of the tracking target in the second frame is generated based on the obtained difference.

11. A non-transitory computer readable medium storing a program for causing a computer to perform operations included in the image processing method according to claim 10.

* * * * *